United States Patent [19]

Pierce, Jr.

[11] Patent Number: 4,740,013

[45] Date of Patent: Apr. 26, 1988

[54] SHOCK UNIT

[76] Inventor: Foye D. Pierce, Jr., 670 S. Pease, Vermontville, Mich. 49096

[21] Appl. No.: 920,978

[22] Filed: Oct. 20, 1986

[51] Int. Cl.⁴ .............................................. B60G 11/14
[52] U.S. Cl. ..................................... 280/701; 280/696
[58] Field of Search .................. 280/701, 112 A, 696, 280/689, 690, 691, 698, 724; 267/20 R, 20 A, 34

[56] References Cited

U.S. PATENT DOCUMENTS 1,410,313   3/1922   Hupp ................................. 267/20 R
1,998,477   4/1935   Wikander ............................ 280/696
3,473,822  10/1969   Fitch ................................. 267/20 R

FOREIGN PATENT DOCUMENTS 627365  10/1961  Italy ................................. 280/112 A
206308  11/1923  United Kingdom ............. 267/20 R Primary Examiner—John J. Love
Assistant Examiner—Karin L. Ferriter
Attorney, Agent, or Firm—Richard L. Miller

[57] ABSTRACT

A shock unit for a vehicle that has a frame, a pair of wheel assemblies and a pair of guiding members for independently guiding the wheel assemblies, in which the guiding members are pivotally connected to the shock unit. The invention consists of a housing connected to the frame. The housing has a pair of oppositely positioned horizontal piston chambers. A pair of spring biased piston assemblies are provided. Each of the piston assemblies extend outwardly from each of the piston chambers and connect to lower portions of one of the guiding members for controlling vertical movement of one of the wheel assemblies with respect to the frame. A device for adjusting spring tension of each of the piston assemblies is also provided.

3 Claims, 1 Drawing Sheet

U.S. Patent
Apr. 26, 1988
4,740,013
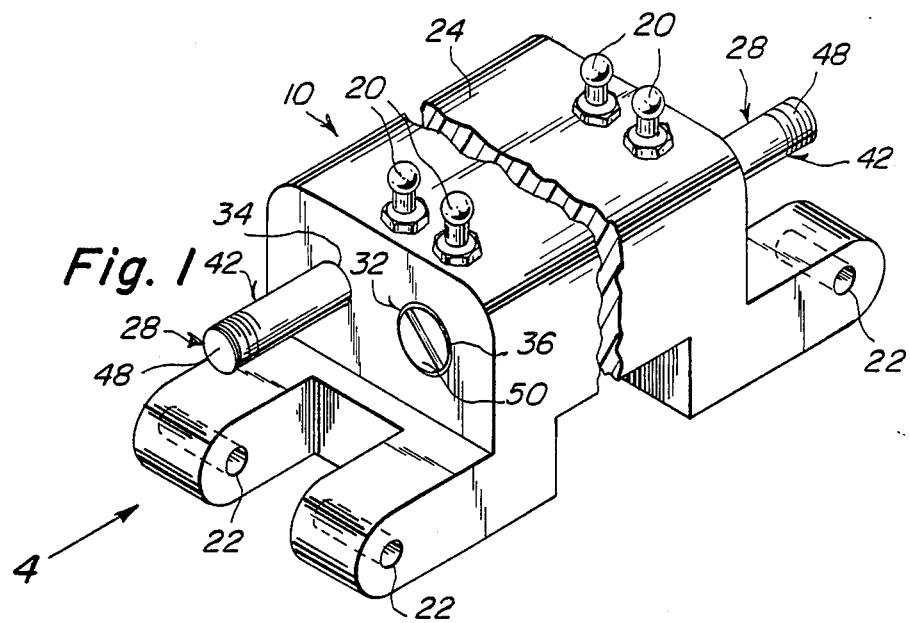
Fig. 1
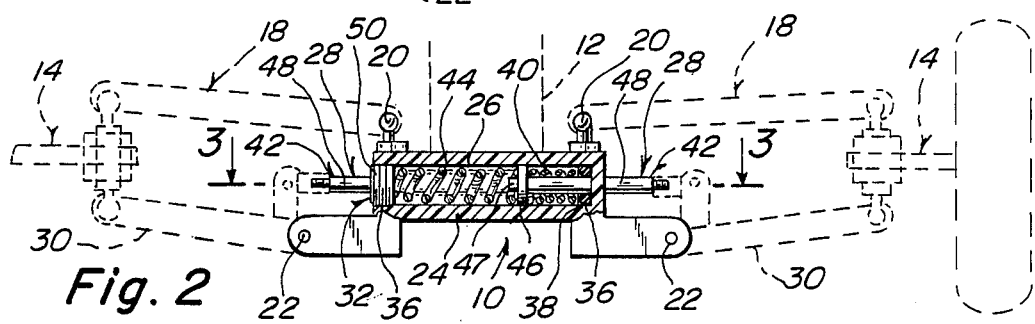
Fig. 2
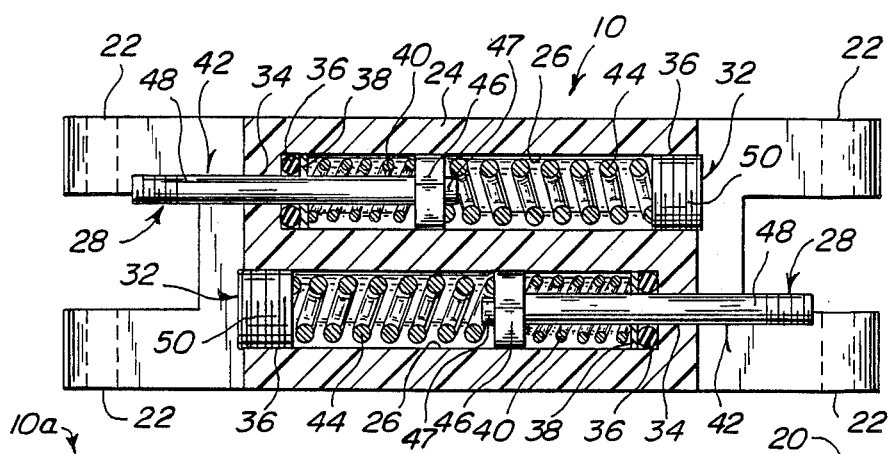
Fig. 3
Fig. 6
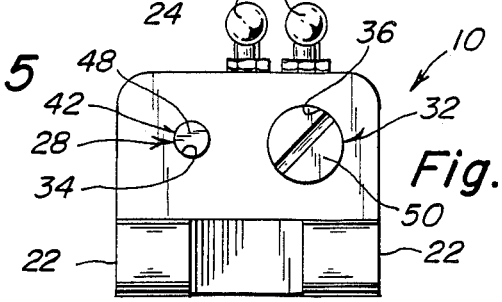
Fig. 5
Fig. 4

SHOCK UNIT

BACKGROUND OF THE INVENTION

The instant invention relates generally to vehicle suspension systems and more specifically it relates to a shock unit for 1/12, 1/10 and ⅛ scale model car vehicles and the like.

Numerous vehicle suspension systems have been provided in the prior art that are adapted to suspend wheels independently of each other from the vehicle frame. For example, U.S. Pat. Nos. 2,126,084; 2,186,065 and 3,137,513 all are illustrative of such prior art. While these units may be suitable for the particular purpose to which they address, they would not be as suitable for the purpose of the present invention as hereafter described.

SUMMARY OF THE INVENTION

A primary object of the present invention is to provide a shock unit for vehicles and the like that will overcome the shortcomings of the prior art devices.

Another object is to provide a shock unit for vehicles and the like in which its housing is fabricated out of nylon material making it light weight.

An additional object is to provide a shock unit for vehicles and the like that uses fewer support parts compared to a conventional coil over shock type suspension system.

A further object is to provide a shock unit for vehicles and the like that is simple and easy to use.

A still further object is to provide a shock unit for vehicles and the like that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only and that changes may be made in the specific construction illustrated and described within the scope of the appended claims.

BRIEF DESCRIPTION OF THE DRAWING FIGURES

The figures in the drawings are briefly described as follows:

FIG. 1 is an enlarged perspective view of the instant invention with the center portion broken away.

FIG. 2 is a front elevational view thereof with parts broken away and other parts shown in phantom.

FIG. 3 is an enlarged cross sectional view taken along line 3—3 in FIG. 2.

FIG. 4 is an enlarged end view taken in the direction of arrow 4 in FIG. 1.

FIG. 5 is a top view of a modified version of the invention.

FIG. 6 is a front view of the modification shown in FIG. 5.

DETAILED DESCRIPTION OF THE PREFERRED EMBODIMENTS

Turning now descriptively to the drawings, in which like reference characters denote like elements throughout the several views, FIGS. 1 through 4 illustrate a shock unit 10 for a vehicle of the type having a frame 12, a pair of wheel assemblies 14 and a pair of guiding members 18 for independently guiding the wheel assemblies 14 all shown in phantom in FIG. 2. The guiding members 18 are pivotally connected at 20 and 22 to the shock unit 10.

The shock unit contains a housing 24 connected to the frame 12. The housing has a pair of oppositely positioned horizontal piston chambers 26. A pair of spring biased piston assemblies 28 are also provided. Each of the piston assemblies 28 extend outwardly from each of the piston chambers 26 and is connected to lower portion 30 of one of the guiding members 18 for controlling vertical movement of one of the wheel assemblies 14 with respect to the frame 12. The shock unit 10 also includes a device 32 for adjusting spring tension of each of the piston assemblies 28.

Each piston chamber 26 has a small aperture 34 at one end and a large threaded opening 36 at other end so that each one of the piston assemblies 28 can extend outwardly through the small aperture 34.

Each of the piston assemblies 28 consists of an O-ring 36, a washer 38, a small spring 40, a piston 42 and a main spring 44. The O-ring 36 is placed into the piston chamber 26 adjacent the small aperture 34. The washer 38 is placed into the piston chamber 26 adjacent the O-ring 36. The small spring 40 is placed into the piston chamber 26 adjacent the washer 38. The piston 42 has a head 46 with a step 47 and a rod 48 and is placed into the piston chamber 26 with the head 46 adjacent the small spring 40 and the rod 48 passing through the small spring 40 and out the small aperture 34 so as to be connected to the lower portion 30 of the guiding members 18. The main spring 44 is placed into the piston chamber 26 adjacent the step 47 of the head 46 of the piston 42 so as to apply spring tension to the piston.

The adjusting device 32 includes a pair of adjustment screws 50. Each of the screws is threaded into the large threaded opening 36 of the piston chamber 26 to adjust the spring tension of the main spring 44. The housing 24 is fabricated out of nylon material making the housing light weight.

FIGS. 5 and 6 show a modified shock unit 10a being just half of the shock unit 10. Two shock units 10a are used together in a vehicle whereby if one fails it can be replaced easily with another.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. A shock unit for a vehicle of the type having a frame, a pair of wheel assemblies and a pair of guiding members for independently guiding said wheel assemblies, said wheel assemblies, said guiding members pivotally connected to said shock unit, the improvement comprising:

(a) a housing connected to said frame, said housing having a pair of oppositely positioned horizontal piston chambers;

(b) a pair of spring biased piston assemblies each of said piston assemblies extending outwardly from each of said piston chambers and connected to lower portion of one of said guiding members for controlling vertical movement of one of said wheel assemblies with respect to said frame, with each of said piston chambers having a small aperture of one end and a large threaded opening at other end so that each one of said piston assemblies can extend outwardly through said small aperture, wherein each of said piston assemblies comprises:
 (i) an O-ring placed into said piston chamber adjacent said small aperture;
 (ii) a washer placed into said piston chamber adjacent said O-ring;
 (iii) a small spring placed into said piston chamber adjacent said washer;
 (iv) a piston having a head with a step and rod placed into said piston chamber with said head adjacent said small spring and said rod passing through said small spring and said small aperture so as to be connected to said lower portion of said guiding members; and
 (v) a main spring placed into said piston chamber adjacent said step of said head of said piston so as to apply spring tension to said piston; and
(c) means for adjusting spring tension of each of said piston assemblies.

2. A shock unit as recited in claim 1 wherein said adjusting means includes a pair of adjustment screws, each of said screws threaded into said large threaded opening of said piston chamber to adjust said spring tension of said main spring.

3. A shock unit as recited in claim 2 wherein said housing is fabricated out of nylon material whereby said shock unit is light weight.

* * * * *